United States Patent
Temple

(10) Patent No.: US 6,463,747 B1
(45) Date of Patent: Oct. 15, 2002

(54) METHOD OF DETERMINING ACCEPTABILITY OF A SELECTED CONDITION IN A SPACE TEMPERATURE CONDITIONING SYSTEM

(75) Inventor: Keith A. Temple, Addison, TX (US)

(73) Assignee: Lennox Manufacturing Inc., Marshalltown, IA (US)

( * ) Notice: Subject to any disclaimer, the term of this patent is extended or adjusted under 35 U.S.C. 154(b) by 0 days.

(21) Appl. No.: 09/962,416

(22) Filed: Sep. 25, 2001

(51) Int. Cl.$^7$ ................................................ F25B 49/02
(52) U.S. Cl. .......................................... 62/129; 62/126
(58) Field of Search .......................... 62/125, 126, 127, 62/129, 130, 149, 77, 292; 165/11.1; 236/94

(56) References Cited

U.S. PATENT DOCUMENTS

| | | | |
|---|---|---|---|
| 5,009,074 A | 4/1991 | Goubeaux et al. | 62/126 |
| 5,152,152 A | 10/1992 | Brickner et al. | 62/126 |
| 5,186,014 A | 2/1993 | Runk | 62/129 |
| 5,239,865 A | 8/1993 | Salzer et al. | 62/129 |
| 5,301,514 A | 4/1994 | Bessler | 62/126 |
| 5,560,213 A | 10/1996 | Wieszt | 62/125 |
| 5,713,213 A | 2/1998 | Nobuta et al. | 62/129 |
| 5,724,822 A * | 3/1998 | Jonsson et al. | 62/129 |
| 5,934,087 A * | 8/1999 | Watanabe et al. | 62/126 |
| 5,983,657 A * | 11/1999 | Murata et al. | 62/129 X |
| 5,987,903 A | 11/1999 | Bathia | 62/129 |
| 6,205,798 B1 * | 3/2001 | Porter et al. | 62/129 |
| 6,240,733 B1 * | 6/2001 | Brandon et al. | 62/149 X |
| 6,330,802 B1 * | 12/2001 | Cummings et al. | 62/126 X |
| 6,378,316 B2 * | 4/2002 | Liu et al. | 62/129 |

* cited by examiner

Primary Examiner—Harry B. Tanner
(74) Attorney, Agent, or Firm—W. Kirk McCord

(57) ABSTRACT

In accordance with the present invention, a method of determining acceptability of a selected condition in a space temperature conditioning system is comprised of the steps of perturbing the system while it is in operation by changing operation of at least one component thereof; sensing a change in a first operating parameter of the system in response to the changing step and generating a control signal in response to the change in the first operating parameter being greater than a predetermined limit; sensing a change in a second operating parameter of the system during a period beginning with the perturbing step and ending with the control signal; comparing the change in the second operating parameter with a reference corresponding to an acceptable condition; and determining acceptability of the selected condition in response to the comparing step. In a preferred embodiment, the method according to the present invention is used to determine acceptability of refrigerant charge level in a space temperature conditioning system.

20 Claims, 9 Drawing Sheets

METHOD OF DETERMINING ACCEPTABILITY OF A SELECTED CONDITION IN A SPACE TEMPERATURE CONDITIONING SYSTEM

FIELD OF THE INVENTION

This invention relates generally to space temperature conditioning systems and in particular to a new and improved method of determining acceptability of a selected condition in a space temperature conditioning system.

BACKGROUND ART

Space temperature conditioning systems of the type having a refrigerant as a heat transfer medium are well-known in the art. It is important that the system have sufficient charge of refrigerant in order to function properly. Therefore, it is advisable to monitor the refrigerant charge level in the system to determine if the charge level is acceptable.

Various methods of determining refrigerant charge level are known in the art. One type of method involves steady-state measurements of a selected system operating parameter, such as the subcooling temperature at the condenser outlet, as exemplified by U.S. Pat. No. 5,987,903. Disadvantages of such "steady state" methods of determining refrigerant charge level are that the system must operate at a steady state condition and that the measurements are sensitive to outdoor and indoor ambient temperatures.

Another type of method of determining refrigerant charge level involves measurements of changes in a system operating parameter under transient conditions, as exemplified by U.S. Pat. No. 5,152,152. A disadvantage of such prior art "transient" methods is that they usually require relatively expensive components, such as pressure sensors and/or valves, to perform the necessary measurements.

There is, therefore, a need for an improved method of determining the acceptability of a selected condition, such as refrigerant charge level, in a space temperature conditioning system. There is also a need for a method of determining acceptability of refrigerant charge level in a space temperature conditioning system that is both relatively inexpensive and reliable under a wide range of ambient temperature conditions.

SUMMARY OF THE INVENTION

Figure 1:
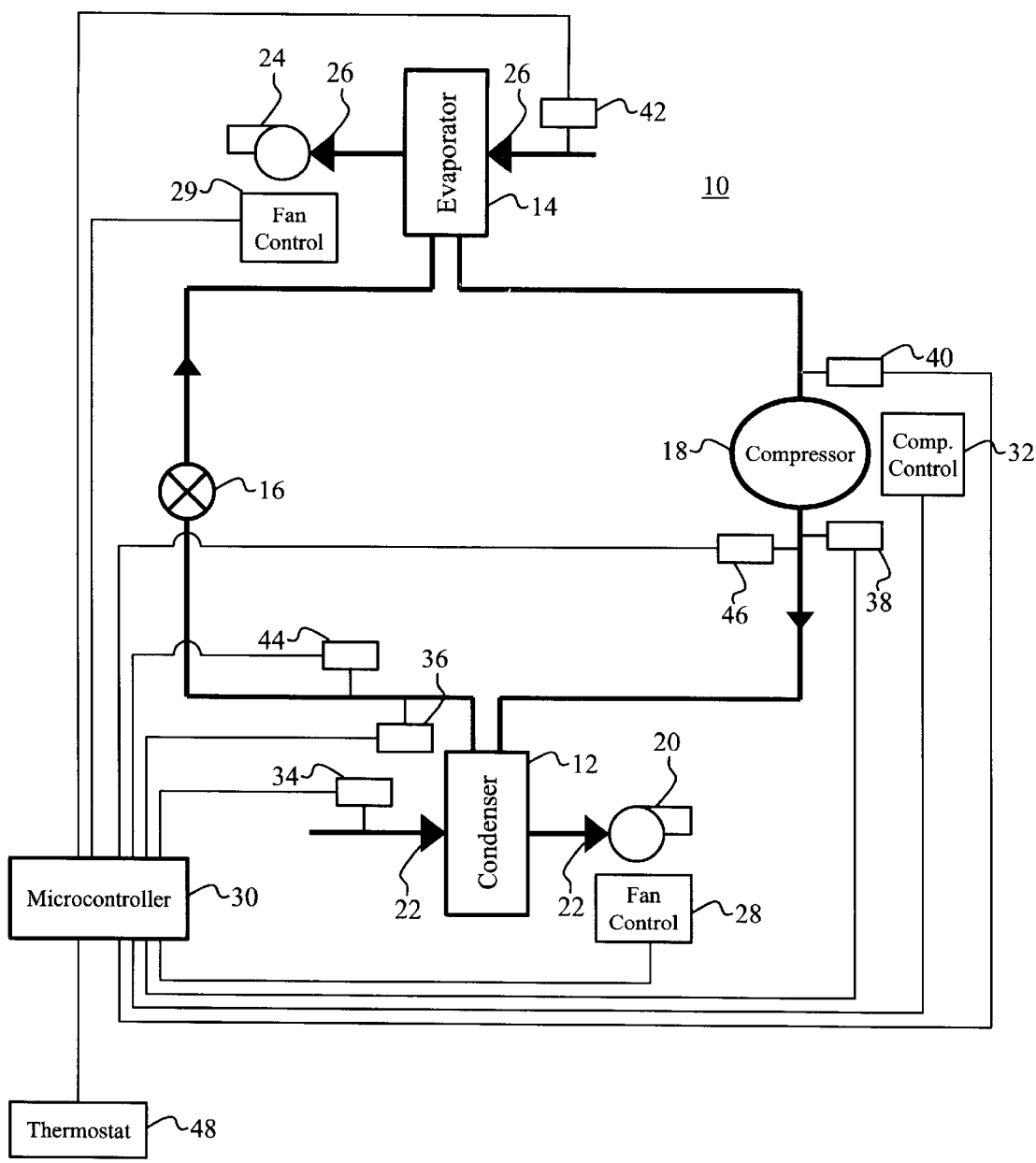
FIG. 1 is a block diagram of a space temperature conditioning system embodying the present invention.

In accordance with the present invention, a method of determining acceptability of a selected condition in a space temperature conditioning system is comprised of the steps of: perturbing the system while it is in operation by changing operation of at least one component of the system; sensing a change in a first operating parameter of the system in response to the changing step and generating a control signal in response to the change in the first operating parameter being greater than a predetermined limit; sensing a change in a second operating parameter of the system during a period determined by the change in operation of the at least one component and the control signal; comparing the change in the second operating parameter with a reference corresponding to an acceptable selected condition; and determining acceptability of the selected condition in response to the comparing step.

In accordance with a preferred embodiment of the invention, the system includes a refrigerant as a heat transfer medium, an evaporator for evaporating the refrigerant, a condenser for condensing the refrigerant and a compressor for compressing the refrigerant and for circulating the refrigerant between the evaporator and the condenser, and the selected condition is refrigerant charge level. The first operating parameter is a function of the refrigerant temperature at a first location between an outlet of the condenser and an inlet of the evaporator, and the second operating parameter is a function of the refrigerant temperature at a second location between an outlet of the compressor and an inlet of the condenser. The system further includes an air mover, such as a fan, for moving air through the condenser.

In accordance with the preferred embodiment, the air mover is disabled for a period corresponding to a time required for a predetermined shift in the refrigerant temperature at the first location to occur. The refrigerant temperature at the second location is measured during the period that the air mover is disabled and the change in the refrigerant temperature at the second location is used to determine a change in the second operating parameter. The change in the second operating parameter is then compared to a reference corresponding to an acceptable refrigerant charge level to determine whether the actual charge level is acceptable.

In accordance with another aspect of the invention, the change in the second operating parameter is used to determine whether the refrigerant charge level in the system is above a predetermined first limit corresponding to an overcharge condition or below a predetermined second limit corresponding to an undercharge condition. Further, if the refrigerant charge level is determined to be below the second limit, the change in the second operating parameter is used to determine if the refrigerant charge level is below a predetermined third limit which is lower than the second limit.

In accordance with another embodiment of the invention, the air mover is disabled for a predetermined fixed period of time.

In accordance with yet another embodiment of the invention, the system further includes a second air mover for moving air through the evaporator and the system is perturbed by disabling the second air mover instead of the air mover operably associated with the condenser.

In accordance with still another embodiment of the invention, the system is perturbed by disabling the compressor instead of the air mover operably associated with the condenser.

BEST MODE FOR CARRYING OUT THE INVENTION

The best mode for carrying out the invention is described hereinbelow with reference to the accompanying drawings. The drawings are not necessarily to scale and in some instances proportions may have been exaggerated in order to more clearly depict certain features of the invention.

Referring to FIG. 1, a space temperature conditioning system 10 of the type normally installed in a residence or commercial building is comprised of a condenser 12, an evaporator 14, an expansion device 16 and a compressor 18. Compressor 18 is operative to circulate a vapor compression refrigerant between condenser 12 and evaporator 14 and to compress the vapor refrigerant before it enters condenser 12. Condenser 12, which is in heat exchange relationship with outdoor ambient air, is operative to substantially condense the vapor refrigerant. Evaporator 14, which is in heat exchange relationship with the indoor air to be cooled, is operative to substantially evaporate the refrigerant. Expansion device 16 facilitates evaporation of the refrigerant by reducing the pressure thereof before the refrigerant enters evaporator 14. The heat absorbed by the refrigerant during evaporation cools the air passing through evaporator 14. The cooled air is supplied to an indoor conditioned space via an air supply duct (not shown). One skilled in the art will recognize that air conditioning system 10 may also be configured as a heat pump by adding a reversing valve (not shown) so that the outdoor heat exchanger (condenser 12) would function as an evaporator in the heating mode and the indoor heat exchanger (evaporator 14) would function as a condenser in the heating mode.

In addition to the primary components of system 10 described hereinabove, condenser 12 has a fan 20 operatively associated therewith, which moves air (typically outdoor ambient air) across condenser 12, as indicated by arrows 22, to cool the refrigerant in condenser 12 and facilitate condensation thereof. Similarly, evaporator 14 has a fan 24 operatively associated therewith for moving indoor air to be cooled across evaporator 14, as indicated by arrows 26. A first fan control device 28 is operatively associated with condenser fan 20 and a second fan control device 29 is operatively associated with evaporator fan 24, both of which are controlled by a controller 30, which is preferably a microcontroller of the PIC12CE67X type, manufactured and sold by Microchip Technology, of Chandler, Ariz. Compressor 18 has a control device 32 operatively associated therewith, which is also controlled by controller 30.

System 10 may also include various temperature and pressure sensors of the types normally used in space temperature conditioning systems. For example, the temperature sensors are preferably thermistors of the JW type, manufactured and sold by Thermonetrics, of St. Mary's, Pa. Temperature sensor 34 senses the dry bulb temperature of the outdoor ambient air before it passes through condenser 12. Temperature sensor 36 senses the temperature of the liquid refrigerant between an outlet of condenser 12 and expansion device 16 (hereinafter referred to as the "liquid refrigerant temperature"). Temperature sensor 38 senses the temperature of the vapor refrigerant between an outlet of compressor 18 and an inlet of condenser 12 (hereinafter referred to as the "vapor refrigerant temperature"). Temperature sensor 40 senses the temperature of the vapor refrigerant on the suction side of compressor 18. Temperature sensor 42 senses the dry bulb temperature of the indoor air before it is cooled by evaporator 14. Pressure switch 44 is a high pressure switch, which disables operation of compressor 18 in response to excessive refrigerant pressure at the outlet of condenser 12. Pressure sensor 46 senses the refrigerant pressure at the outlet of compressor 18.

Also associated with system 10 is a thermostat 48, which typically is located in an indoor conditioned space. In response to the temperature in the indoor space exceeding the set point temperature of the thermostat, a demand for cooling signal is sent by thermostat 48 to controller 30, which in turn activates compressor 18 and fans 20, 24 in the appropriate sequence to initiate a cooling cycle in the conventional manner.

Referring also to FIGS. 2–7, a method for determining refrigerant charge level in space temperature conditioning system 10 in accordance with the present invention will now be described in detail. In accordance with a preferred embodiment of the present invention, inputs from temperature sensors 36, 38 (see FIG. 1) are used to establish baseline data for determining refrigerant charge level. To establish this baseline data, system 10 is operated at various known refrigerant charge levels and a perturbation is imposed on system 10 for a period of time corresponding to the time required for a fixed shift in the liquid refrigerant temperature, as measured by temperature sensor 36. Based on inputs from temperature sensor 38, the change in the vapor refrigerant temperature is measured during the period corresponding to the predetermined fixed shift in liquid refrigerant temperature. To verify the effects of different ambient temperature conditions, these measurements are preferably conducted for several different outdoor and indoor ambient conditions.

Figure 2:
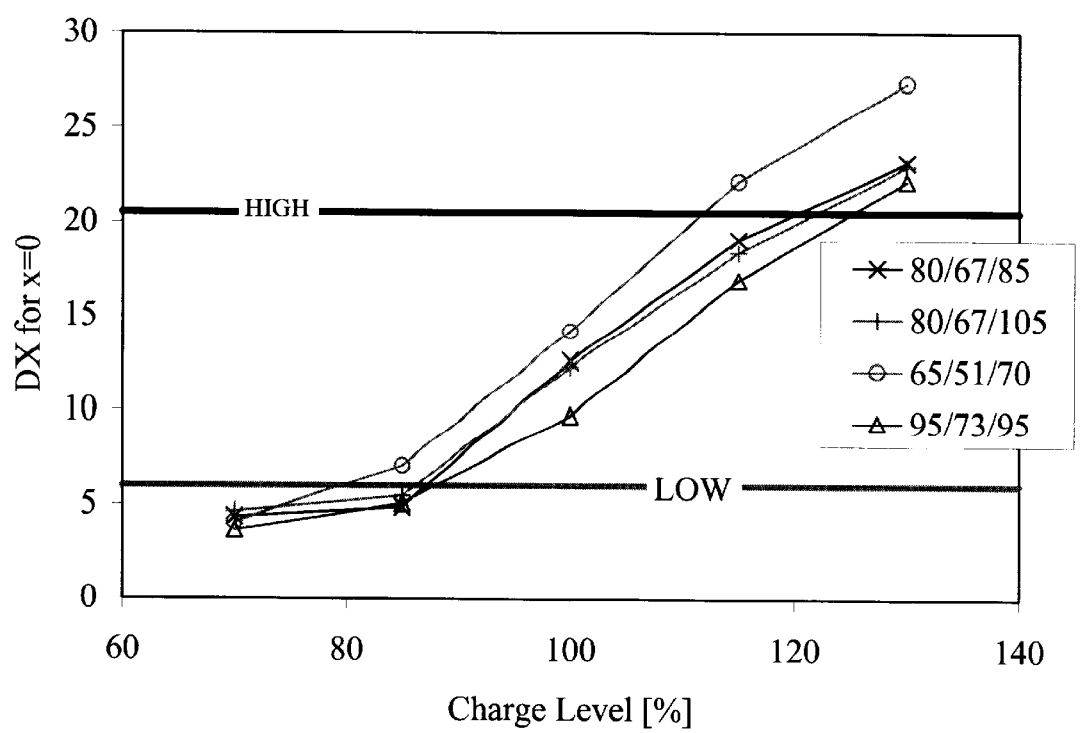
FIG. 2 is a graph of refrigerant charge level as a function of a selected operating parameter in a space temperature conditioning system.

As an example, FIG. 2 shows actual baseline data measured for a heat pump of the HP32-024 type, manufactured and sold by Lennox Manufacturing Inc., of Marshalltown, Iowa, corresponding to a fixed shift of 10° F. in the liquid refrigerant temperature, when the heat pump is operated in the cooling mode and the imposed perturbation is disabling of condenser fan 20 during the data collection period (i.e., the time required for the 10° F. shift in the liquid refrigerant temperature). Further, expansion device 16 is an expansion valve. One skilled in the art will recognize that the appropriate fixed shift in the liquid refrigerant temperature selected for other air conditioning or heat pump systems may be different from 10° F.

Refrigerant charge level as a percentage of normal charge level (with normal charge level being 100%) is plotted on the abscissa and a change in a selected operating parameter (DX), which is a function of inputs from both sensors 36, 38, is plotted on the ordinate. DX during a period corresponding to a 10° F. shift in the liquid refrigerant temperature is plotted for five different refrigerant charge levels and for four, different ambient temperature conditions. The "x" symbols on the graph represent the data taken when the ambient conditions were 80° F. indoor dry bulb temperature (as measured by sensor 42)/67° indoor wet bulb temperature/85° F. outdoor dry bulb temperature (as measured by sensor 34). The "+" symbols represent the data taken when the ambient conditions were 80° F. indoor dry bulb temperature/67° indoor wet bulb temperature/105° F. outdoor dry bulb temperature. The "o" symbols represent the data taken when the ambient conditions were 65° F. indoor dry bulb temperatures/51° indoor wet bulb temperature/70° F. outdoor dry bulb temperature. The "Δ" symbols represent the data taken when the ambient conditions were 95° F. indoor dry bulb temperature/73° indoor wet bulb temperature/95° F. outdoor dry bulb temperature.

The change in the second operating parameter DX is expressed by the following equation (1):

$$DX = DD \cdot (TDi - TLi)^x$$

where
  DD = the change in the vapor refrigerant temperature
  TDi = the vapor refrigerant temperature at the beginning of the measurement period
  TLi = the liquid refrigerant temperature at the beginning of the measurement period x=a coefficient determined by conventional numerical methods for optimum correlation between charge level and DX to minimize the effects of ambient temperature conditions on the relationship between charge level and DX.

Measurements were taken at refrigerant charge levels (expressed as percent of normal charge level) of 70%, 85%, 100% (normal charge level), 115% and 130%. The data were initially plotted for a coefficient of x equal to 0. As shown on the graph, the four data points for the different ambient temperature conditions corresponding to each charge level are relatively close together, which indicates that DX has a very low dependence on ambient conditions. Therefore, a coefficient of x equal to 0 is acceptable for this purpose. However, the coefficient x for other types of air conditioning or heat pump units may be different from 0 and is typically in a range from 0 to −1.5.

This baseline data is then used as a reference with which to compare an actual measured DX value. For example, FIG. 2 indicates that at normal charge level, DX is in a range from about 10° F. to 15° F. Maximum and minimum limits on DX may be established to determine if the refrigerant charge level is within acceptable limits. For example, in FIG. 2, the maximum and minimum limits of DX are 20.5° F. and 6° F., respectively. Therefore, if DX is within these limits, the charge level is deemed to be acceptable. However, if DX is less than 6° F. or greater than 20.5° F., an undercharge or overcharge condition, as the case may be, is indicated. This baseline data is stored in controller 30.

Figure 3:
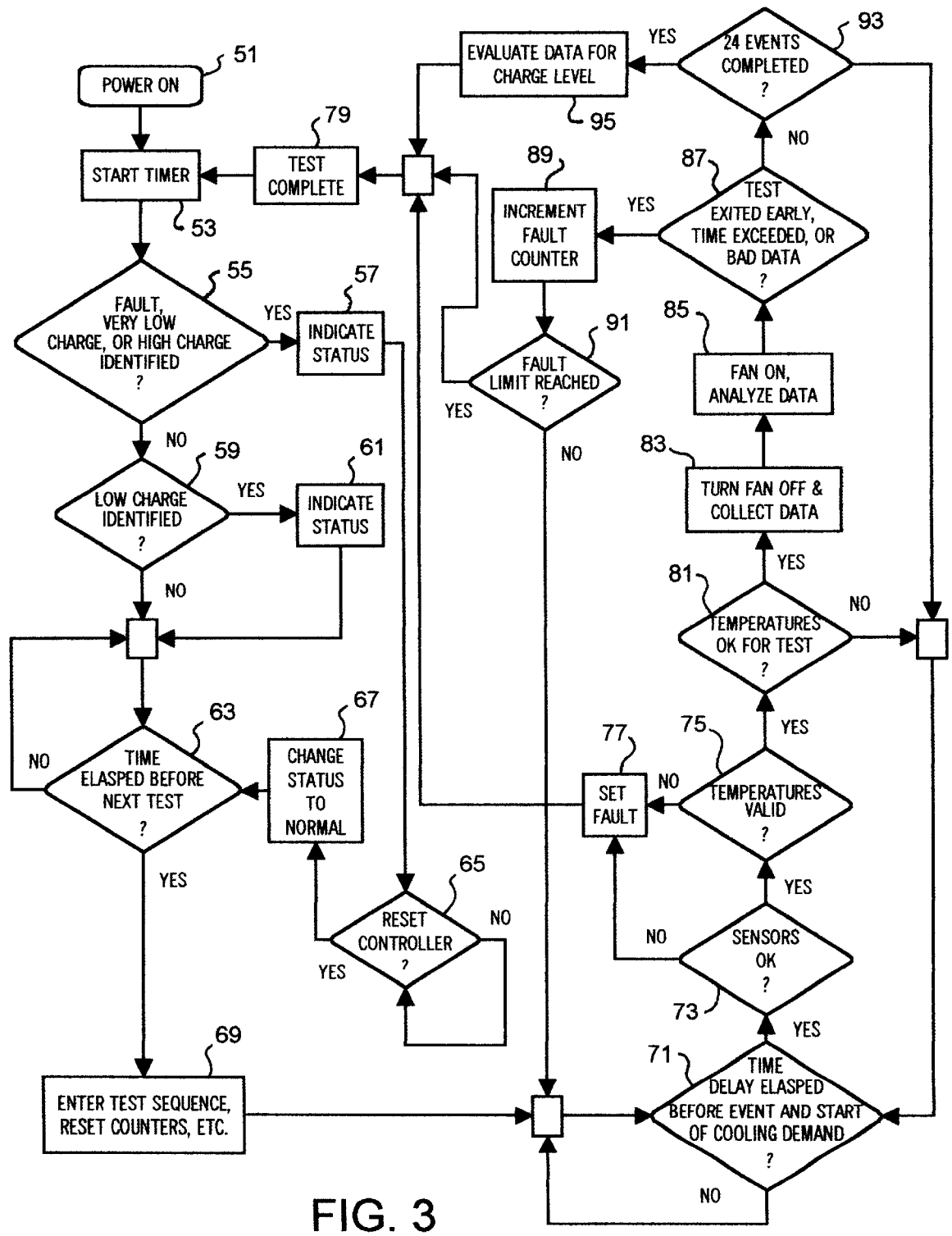
FIG. 3 is a simplified flow diagram of a refrigerant charge level determination algorithm in accordance with the present invention.

Referring to FIG. 3, an overview of the refrigerant charge level determination algorithm in accordance with the present invention is shown. Upon "Power On" of controller 30 (step 51), a timer begins counting (step 53) and controller 30 determines whether a "Fault" status, a "Very Low" refrigerant charge condition or a "High" refrigerant charge condition exists, pursuant to step 55. If one of these three conditions exists, an indication thereof is given, pursuant to step 57. If none of these three conditions exists, controller 30 determines whether a "Low" refrigerant charge condition exists (step 59). If so, this condition is indicated (step 61). If a "Low" charge condition does not exist, controller 30 determines whether a predetermined amount of time has elapsed since the last refrigerant charge test (step 63). Until that time has elapsed, controller 30 will not begin the next test cycle.

Returning to step 57, if a "Fault", "Very Low" charge or "High" charge condition is indicated, controller 30 must be reset by a service technician (step 65) before continuing with the charge test algorithm. When controller 30 has been reset, the status is set at "Normal" (step 67).

After the requisite time has elapsed since the last test sequence (step 63), all test counters are set to zero and a new test sequence is begun (step 69). Each test sequence consists of 24 discrete events during which data is recorded. Each event is spaced apart by a predetermined time. Pursuant to step 71, a test event does not begin until the requisite time between events has elapsed and a demand for cooling from thermostat 48 has been received. Before controller 30 begins recording data, it first checks to determine if temperature sensors 36, 38 are operating properly (step 73) and if the temperatures measured by these sensors are within the prescribed ranges suitable for conducting the charge level test (step 75). If either of these checks indicates a problem, a "Fault" status is set (step 77) and the algorithm goes to step 79 (test complete).

If neither of the checks under steps 73, 75 indicates a problem, controller 30 checks to determine whether outdoor ambient conditions are suitable for the refrigerant charge level test by checking whether the liquid refrigerant temperature is within predetermined acceptable limits (step 81). If not, the algorithm will return to step 71. If ambient conditions are suitable for the charge level test, controller 30 will turn off condenser fan 20 for a period of time not to exceed a predetermined maximum (step 83). Further, controller 30 will begin recording the liquid refrigerant temperature and the vapor refrigerant temperature based on inputs from sensors 36, 38, respectively, at predetermined time intervals, also pursuant to step 83.

Controller 30 stops recording the temperature data when the shift in the liquid refrigerant temperature reaches the target shift (e.g., 10° F.), enables condenser fan 20 and analyzes the recorded data to determine if the data is valid for the charge level determination (step 85). However, if the event was aborted before the target shift in the liquid refrigerant temperature was achieved because the maximum event time had elapsed or because of some other problem condition, or if the recorded data was determined to be invalid (step 87), a "Fault" counter is incremented (step 89). If the "Fault" count has exceeded a predetermined limit (step 91), the algorithm goes to step 79. However, if the "Fault" count limit has not been exceeded, the algorithm returns to step 71 to start a new recording event.

Referring again to step 87, if no "Fault" condition is indicated, controller will determine whether a total of 24 events with valid data have been completed (step 93), which indicates that the test sequence is complete. If so, controller 30 evaluates the data to determine refrigerant charge level by comparing the data recorded during the 24 events to the predetermined baseline or reference data, pursuant to step 95. The algorithm then goes to step 79, which indicates a complete test. If applicable, a "Very Low", a "High" or a "Low" refrigerant charge condition, as the case may be, is indicated, pursuant to step 57 or 61. Referring again to step 93, if the total number of events with valid data is less than 24, the algorithm returns to step 71 to begin a new event.

Referring now to FIGS. 4–7, the refrigerant charge level determination algorithm will now be described in greater detail. This algorithm is programmed in memory in controller 30. Upon "Power On" of controller 30 (step 101), an event timer (te) is started, pursuant to step 103. Next, the current status of system 10 is determined and an indication is given, as appropriate, if the status is other than "Normal". For example, if the current status corresponds to a "Fault" status (step 105), a "Very Low" refrigerant charge status (step 107), a "High" refrigerant charge status (step 109) or a "Low" refrigerant charge status (step 111), an appropriate indication of such status is given pursuant to step 113, step 115, step 117 or step 119, as the case may be.

If the current status is a "Fault" status, a "Very Low" status or a "High" status, system 10 will continue to operate normally (step 121) until controller 30 is reset by a service technician, pursuant to step 123. After controller 30 is reset, the status is set to "Normal" and the average value of the DX parameter described hereinabove (DXa) is set to zero, pursuant to step 125. Controller 30 will then wait until 720 minutes have elapsed on event timer te (step 127). When event timer te indicates that more than 720 minutes have elapsed (step 127), controller 30 determines if there is a demand for cooling (step 129) from thermostat 48 before proceeding further.

However, if neither a "Fault" indication nor a "Very Low" or "High" refrigerant charge condition is present, controller 30 will go from step 111 to step 127. Before event timer te has counted 720 minutes, controller 30 may have been reset by a service technician from a "Low" refrigerant charge condition, pursuant to step 131. If controller 30 has been reset, the algorithm goes back to step 125. If controller 30 has not been reset pursuant to step 131, normal operation continues, pursuant to step 133, until event timer te indicates that 720 minutes have elapsed (step 127). When event timer te indicates that more than 720 minutes have elapsed, controller 30 determines if there is a demand for cooling (step 129) from thermostat 48 to proceed further. Therefore, a refrigerant charge level test is not begun in the middle of a cooling cycle and the time between successive tests is at least 720 minutes (12 hours).

When there is no demand for cooling and at least 720 minutes have elapsed since the last refrigerant charge test cycle, controller 30 sets the following parameters as indicated in step 135.

Test event counter (n)=0

Sum of the changes in the DX parameter (DXsum)=0

Sum of the final vapor refrigerant temperatures at the end of the test events (TDsum)=0

Fault One counter (F1), Fault Two counter (F2), Fault Three counter (F3) and Fault Four counter (F4)=0

Run time for third and second most recent cooling cycles (trun3, trun2, respectively)=180 seconds Previous average change in DX parameter (DXap)= average change (DXa)

Figure 5A:
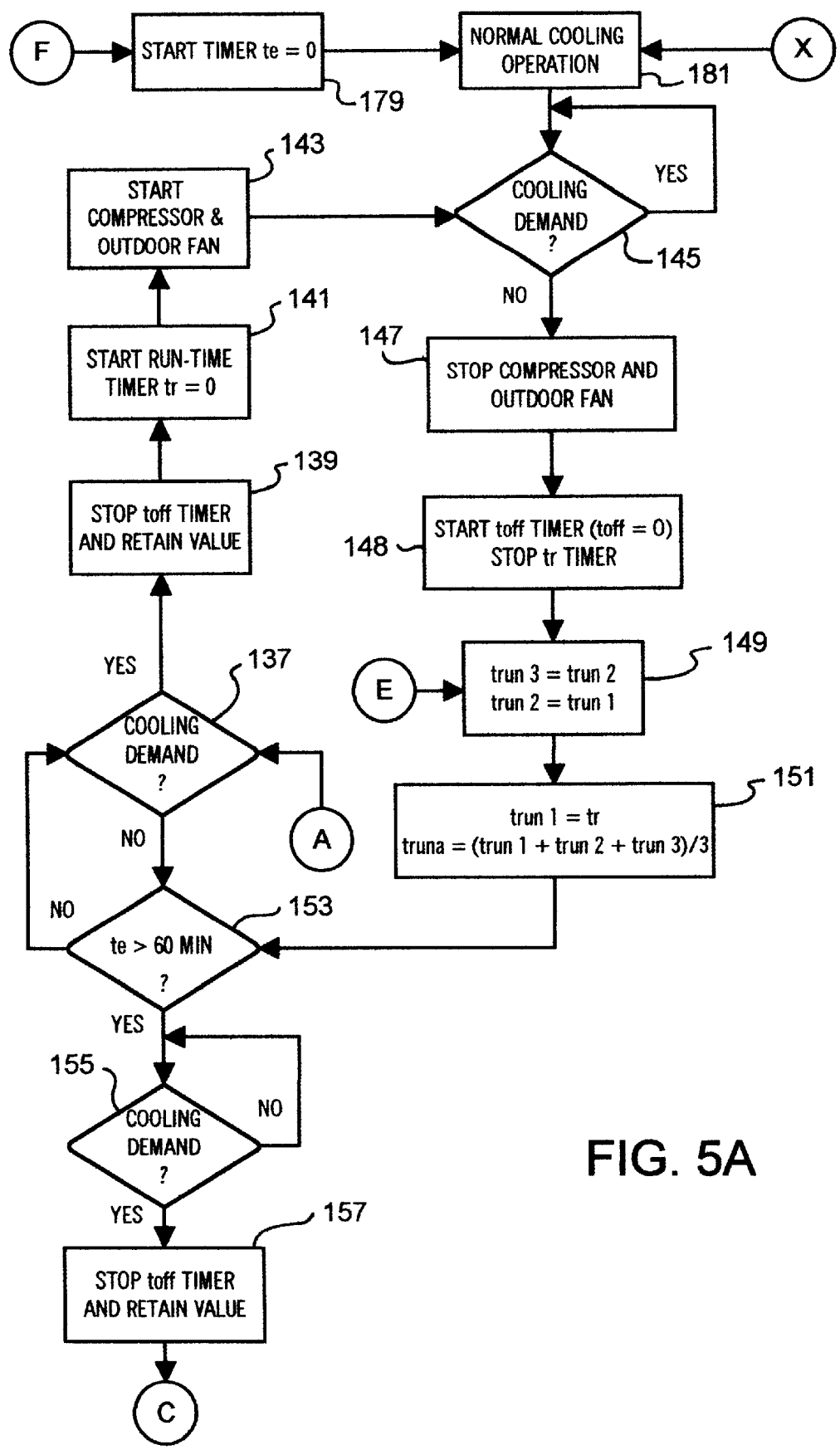
Figure 5B:
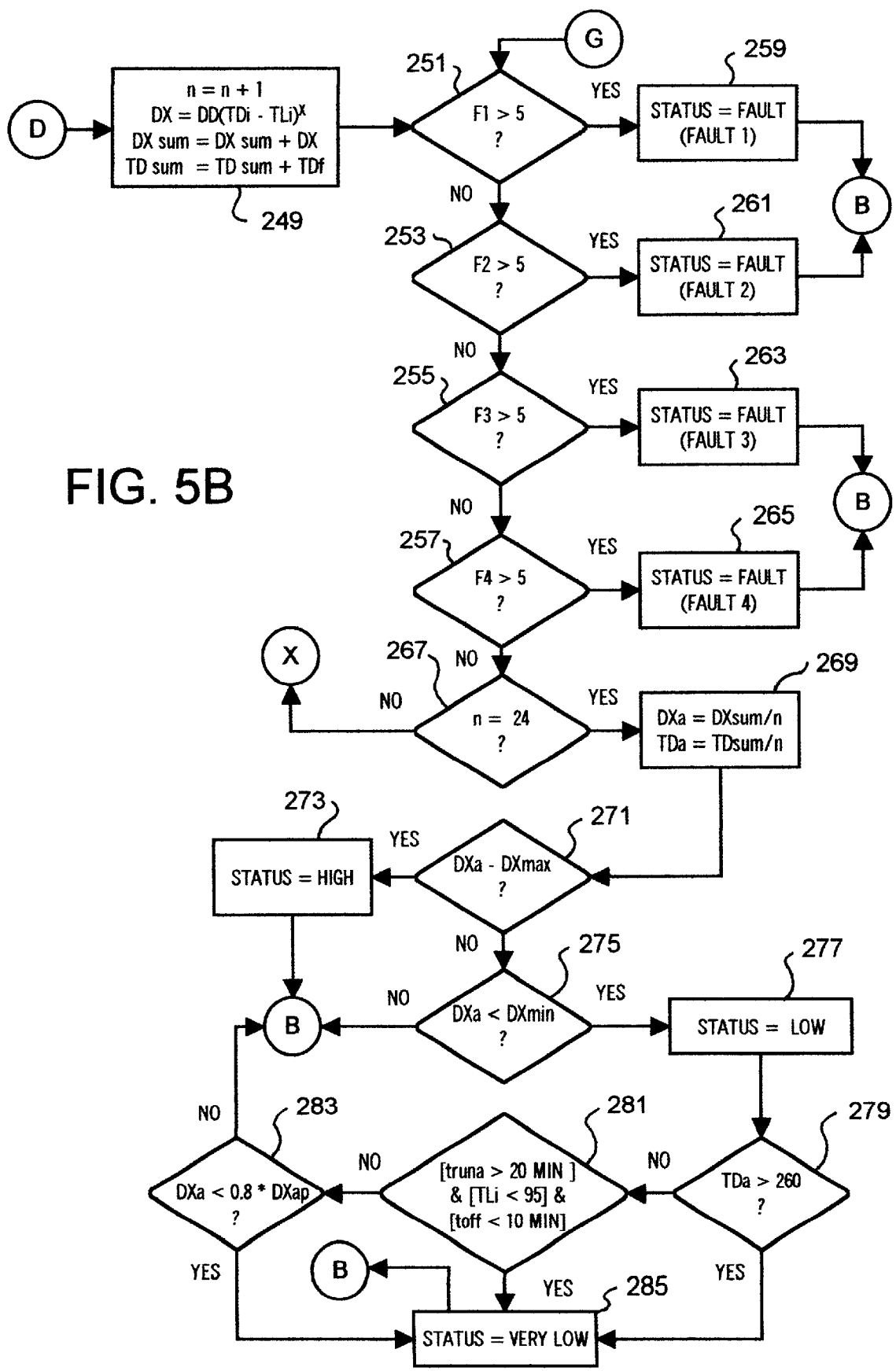

The algorithm then continues on to "A" in FIG. 5.

Referring to FIG. 5, when a cooling demand from thermostat 48 is detected (step 137), cooling off-time timer (toff) is stopped and the off time between cooling cycles is determined, pursuant to step 139. Cooling run-timer (tr) is reset to zero and is restarted, pursuant to step 141, and compressor 18 and condenser fan 20 are started, pursuant to step 143. Controller 30 then waits for the cooling demand to cease (step 145) and shuts off compressor 18 and condenser fan 20 (step 147). Cooling run-time timer tr and cooling off-time timer toff are stopped, pursuant to step 148 and the run time for the three previous cooling cycles (trun3, trun2 and trun1) are updated, pursuant to steps 149 and 151. The average run time (truna) is computed by adding the three previous run times (trun1, trun2 and trun3) and then dividing by 3, as shown in step 151. Controller 30 iteratively performs steps 137 through 151, as described hereinabove, until event timer te indicates that more than 60 minutes have elapsed, pursuant to step 153.

When event timer te indicates that more than 60 minutes have elapsed since the last test event (step 153), controller 30 will wait for a cooling demand (step 155) and will calculate the off time between cooling cycles (toff), pursuant to step 157. The algorithm then goes to "C" in FIG. 6.

Figure 6:
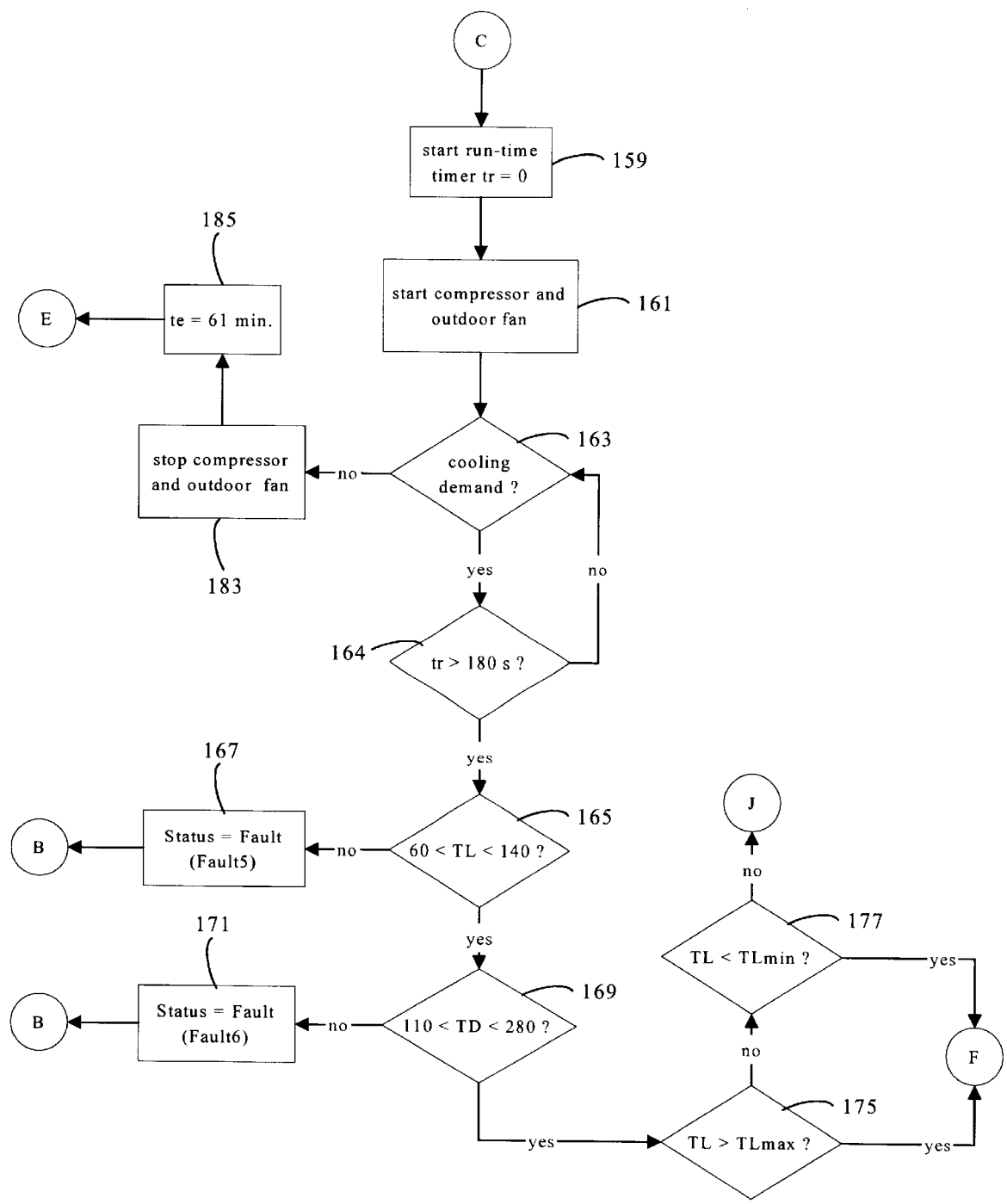

Continuing on to FIG. 6, cooling run time timer tr is reset to zero and restarted, pursuant to step 159, and compressor 18 and condenser fan 20 are started, pursuant to step 161. If a demand for cooling is present (step 163), controller 30 will wait until the cooling run time has exceeded 180 seconds (step 164) and will then determine if the temperatures measured by sensors 36, 38 are within acceptable limits. If the liquid refrigerant temperature (TL) measured by sensor 36 is not in a range between 60° F. and 140° F. (step 165), a "Fault 5" status is indicated, pursuant to step 167. If TL is within the acceptable range, pursuant to step 165, but the vapor refrigerant temperature (TD) measured by sensor 38 is not in a range between 110° F. and 280° F., pursuant to step 169, a "Fault 6" status is indicated, pursuant to step 171. If either a "Fault 5" or a "Fault 6" status is indicated, the algorithm goes to "B" in FIG. 4 and cooling run-time timer tr is stopped pursuant to step 173. Controller 30 will then proceed in accordance with the steps described hereinabove with reference to FIG. 4, beginning with step 103.

If a "Fault" status is not indicated pursuant to either step 167 or step 171, controller 30 determines whether the liquid refrigerant temperature TL is greater than a predetermined maximum temperature (TLmax) or is less than a predetermined minimum temperature (TLmin), pursuant to steps 175 and 177. TLmax and TLmin correspond to high and low ambient temperature conditions, respectively. For example, TLmax may be set at 120° F. and TLmin may be set at 75° F. If either one of those conditions is indicated, the ambient conditions are such that a reliable indication of refrigerant charge level cannot be obtained and the algorithm goes to "F" in FIG. 5, whereupon event timer te is reset to zero and restarted, pursuant to step 179 and normal cooling operation continues, pursuant to step 181. Controller 30 will proceed beginning with step 145, as previously described with reference to FIG. 5. However, if TL is between TLmax and TLmin, the algorithm goes to "J" in FIG. 7.

Referring again to step 163 in FIG. 6, if the cooling demand ceases before cooling run time timer tr has counted 180 seconds (step 164), compressor 18 and condenser fan 20 are turned off, pursuant to step 183 and event counter te is set at 61 minutes, pursuant to step 185. The algorithm then goes to "E" in FIG. 5 and controller 30 performs the steps beginning with step 149.

Figure 7A:
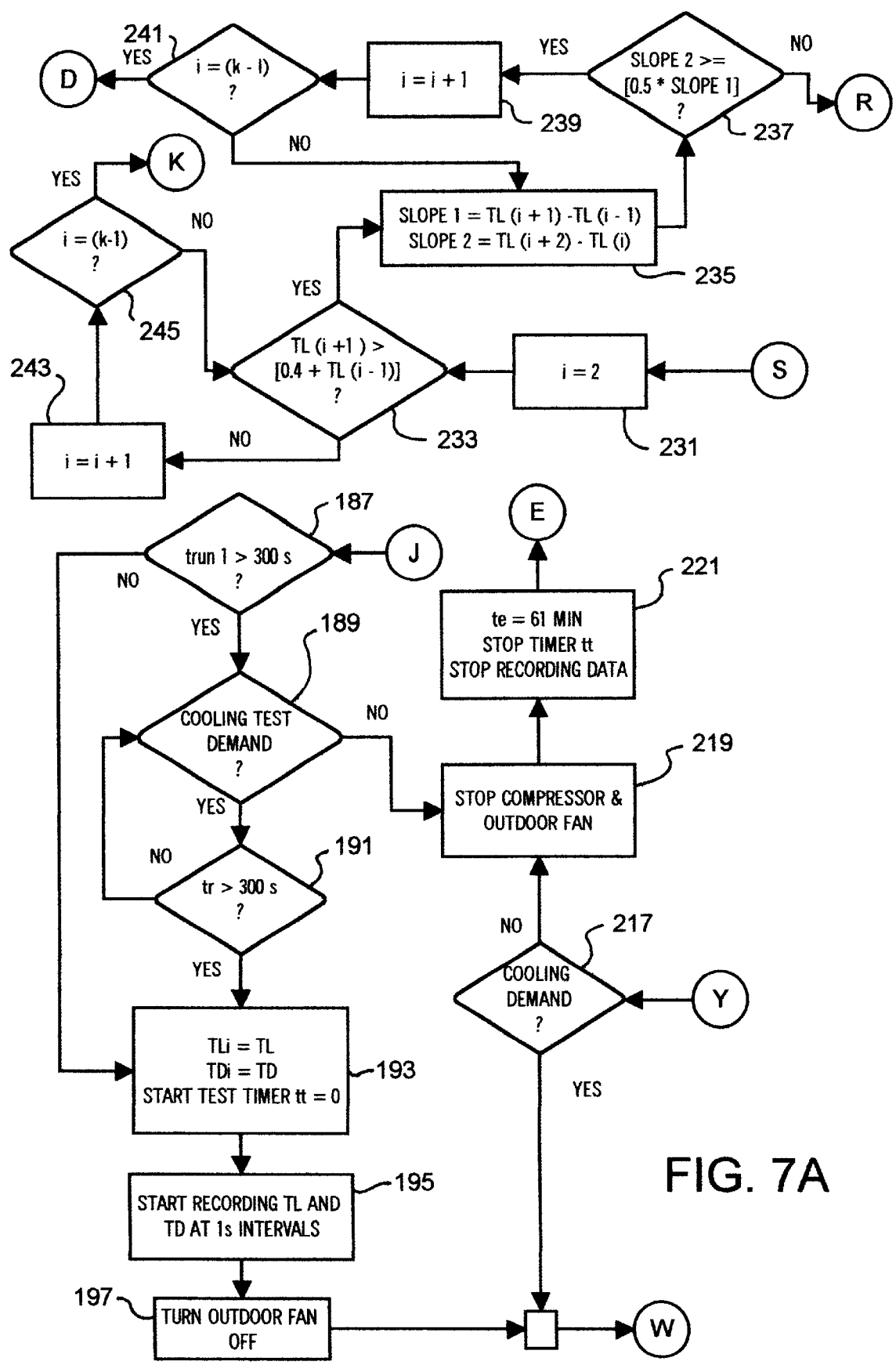
Figure 7B:
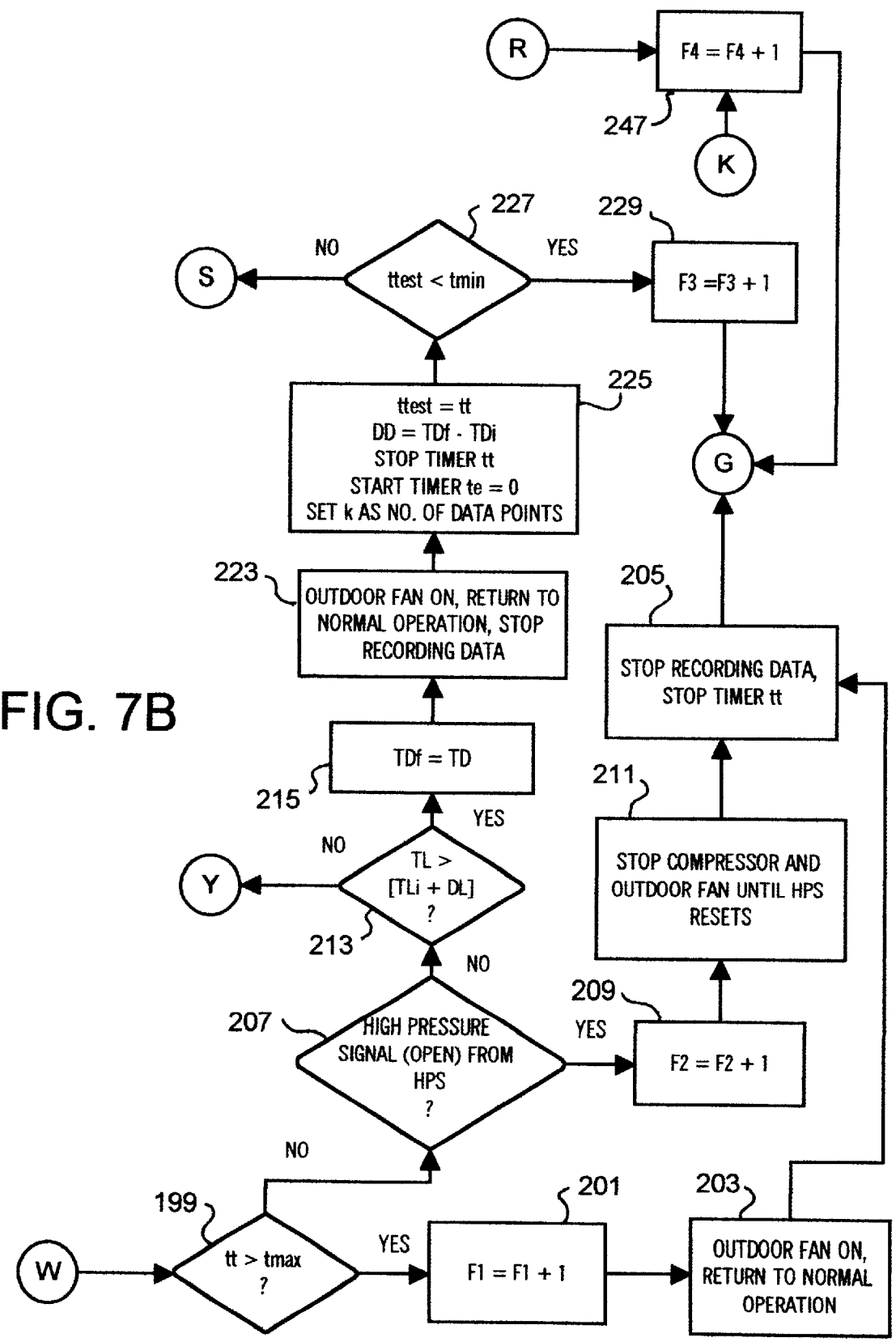

Referring to FIG. 7, if TL is between TLmax and TLmin and no "Fault" status is indicated, controller 30 determines whether the run time for the previous cooling cycle (trun1) was greater then 300 seconds, pursuant to step 187. If so, and a cooling demand is present (step 189), controller 30 will determine whether cooling run-time timer tr indicates that more then 300 seconds have elapsed since the onset of the cooling demand, pursuant to step 191. If so, the initial liquid refrigerant temperature (TLi) is set equal to the liquid refrigerant temperature TL measured by sensor 36 and the initial vapor refrigerant temperature (TDi) is set equal to the vapor refrigerant temperature TD measured by sensor 38, pursuant to step 193. The test timer (tt) is set at zero and started and controller 30 begins the data recording event, also pursuant to step 193. Pursuant to step 195, the liquid refrigerant temperature TL and the vapor refrigerant temperature TD are recorded at one second intervals. Condenser fan 20 is turned off, pursuant to step 197. This temperature data will continue to be recorded at one second intervals until the occurrence of one of the conditions described hereinbelow. Referring again to step 187, if the run time for the previous cooling cycle (trun1) was not greater than 300 seconds, the algorithm will skip steps 189 and 191 and go directly to step 193.

One condition which will terminate the recording event is if the test timer tt exceeds a maximum test time tmax (e.g., 45 seconds), pursuant to step 199. In that event, a Fault counter (F1) is incremented, pursuant to step 201, condenser fan 20 is enabled and system 10 returns to normal operation, pursuant to step 203. Controller 30 stops recording data and stops test timer tt, pursuant to step 205, and the algorithm goes to "G" in FIG. 5. Another condition which will terminate the recording event is a high pressure signal from high pressure switch 44 (FIG. 1), pursuant to step 207. If this condition occurs, a second Fault counter (F2) is incremented, pursuant to step 209, and compressor 18 and condenser fan 20 are disabled until high pressure switch 44 is reset, pursuant to step 211.

If neither of the conditions in steps 199 or 207 is present, the data recording event will continue until the liquid refrigerant temperature TL exceeds the sum of the initial liquid refrigerant temperature TLi plus a predetermined target shift in liquid refrigerant temperature DL (e.g., 10° F.), pursuant to step 213. When this condition is satisfied, the final vapor refrigerant temperature (TDf) is set equal to the then current vapor refrigerant temperature TD (step 215). A third condition which will abort the data collection event is a cessation of the demand for cooling, pursuant to step 217. Compressor 18 and condenser fan 20 are then disabled, pursuant to step 219. Event timer te is set to 61 minutes, test timer tt is stopped and the data recording event is stopped, pursuant to step 221. The algorithm then goes to "E" in FIG. 5.

Assuming the data collection event is successfully completed (i.e., the target shift DL in step 213 is reached), condenser fan 20 is turned on and system 10 returns to normal operation, pursuant to step 223. The time elapsed for the test event (ttest) is set equal to the count of test timer tt and test timer tt is stopped. The change in the vapor refrigerant temperature (DD) is then computed by subtracting the initial vapor refrigerant temperature TDI from the final vapor refrigerant temperature TDf, pursuant to step 225. The event timer te is reset to zero and restarted and a number (k) is set as the number of data points taken during the immediately preceding event that are to be examined to determine if the data recorded during the event is valid, also pursuant to step 225. If the event time ttest is less than a predetermined minimum time tmin (e.g., 10 seconds), pursuant to step 227, a third Fault counter F3 is incremented, pursuant to step 229, and the algorithm goes to "G" in FIG. 5.

If the event time is not less than the predetermined minimum time, pursuant to step 227, controller 30 will then determine whether the recorded data is valid, beginning with step 231. An index for data points (i) is set at 2, pursuant to step 231. Controller 30 then determines, pursuant to step 233, whether the liquid refrigerant temperature TL at index i+1 is greater than 0.4+the liquid refrigerant temperature TL at index i−1. If so, controller 30 determines a first slope (slope 1) by subtracting the liquid refrigerant temperature at index i−1 (TL (i−1)) from the liquid refrigerant temperature at index i+1 (TL (i+1)) and determines a second slope (slope 2) by subtracting the liquid line temperature at index i (TL(i)) from the liquid line temperature at index i+2 (TL (i+2)), pursuant to step 235. If slope 2 is greater than or equal to 0.5×slope 1 (step 237), index i is incremented by 1 (step 239) and controller 30 determines whether i is one less than the number of data points (i=k−1), pursuant to step 241. If so, the data collected during the event is considered valid and used in the refrigerant charge level determination and the algorithm goes to "D" in FIG. 5.

However, if the: condition in step 233 is not satisfied, index i is incremented by 1, pursuant to step 243, and controller 30 continues to determine whether TL (i+1) is greater than 0.4 plus TL (i−1), pursuant to step 233 until i=k−1 (step 245). When i=k−1, a fourth Fault counter F4 is incremented, pursuant to step 247 and the data collected during the immediately preceding event is not considered valid for determining refrigerant charge level. The data may also be considered invalid if slope 2 is not greater than or equal to 0.5×slope 1, pursuant to step 237, in which case Fault counter F4 is incremented, pursuant to step 247. Incrementing Fault counter F4 causes the algorithm to go to "G" in FIG. 5.

Referring again to "D" in FIG. 5, if the data collected during the event is valid, test event counter (n) is incremented by one, pursuant to step 249, the DX parameter is computed according to equation (1) described hereinabove and the sum of the DX values (DXsum) is incremented by the DX value measured during the last event. Also pursuant to step 249, the sum of the vapor refrigerant temperatures (TDsum) is incremented by adding the final vapor refrigerant temperature (TDf). Controller 30 then tests Fault counters F1, F2, F3 and F4, pursuant to steps 251, 253, 255 and 257, respectively, and if any one of the Fault counters exceeds five, the appropriate Fault status is indicated, pursuant to step 259, 261, 263 or 265, as the case may be, and the algorithm goes to "B" in FIG. 4. Controller 30 will also test Fault counters F1, F2, F3 and F4 if the algorithm branches to "G" in FIG. 5 from step 205, 229 or 247 in FIG. 7, as previously described.

If no Fault status is indicated pursuant to step 259, 261, 263 or 265, controller 30 determines whether test event counter (n) equals 24, pursuant to step 267. A test cycle consists of 24 discrete events. If n equals 24, the average value of the DX parameter (DXa) for the test cycle is computed by dividing the sum of the DX values (DXsum) for the 24 events by the number of events n and the average vapor refrigerant temperature (TDa) for the test cycle is computed by dividing the sum of the vapor discharge temperatures (TDsum) for the 24 events by the number of events n, pursuant to step 269. The DXa value for the test cycle is compared to the previously determined baseline data to determine if a "High" or "Low" charge condition exists.

Figure 4:
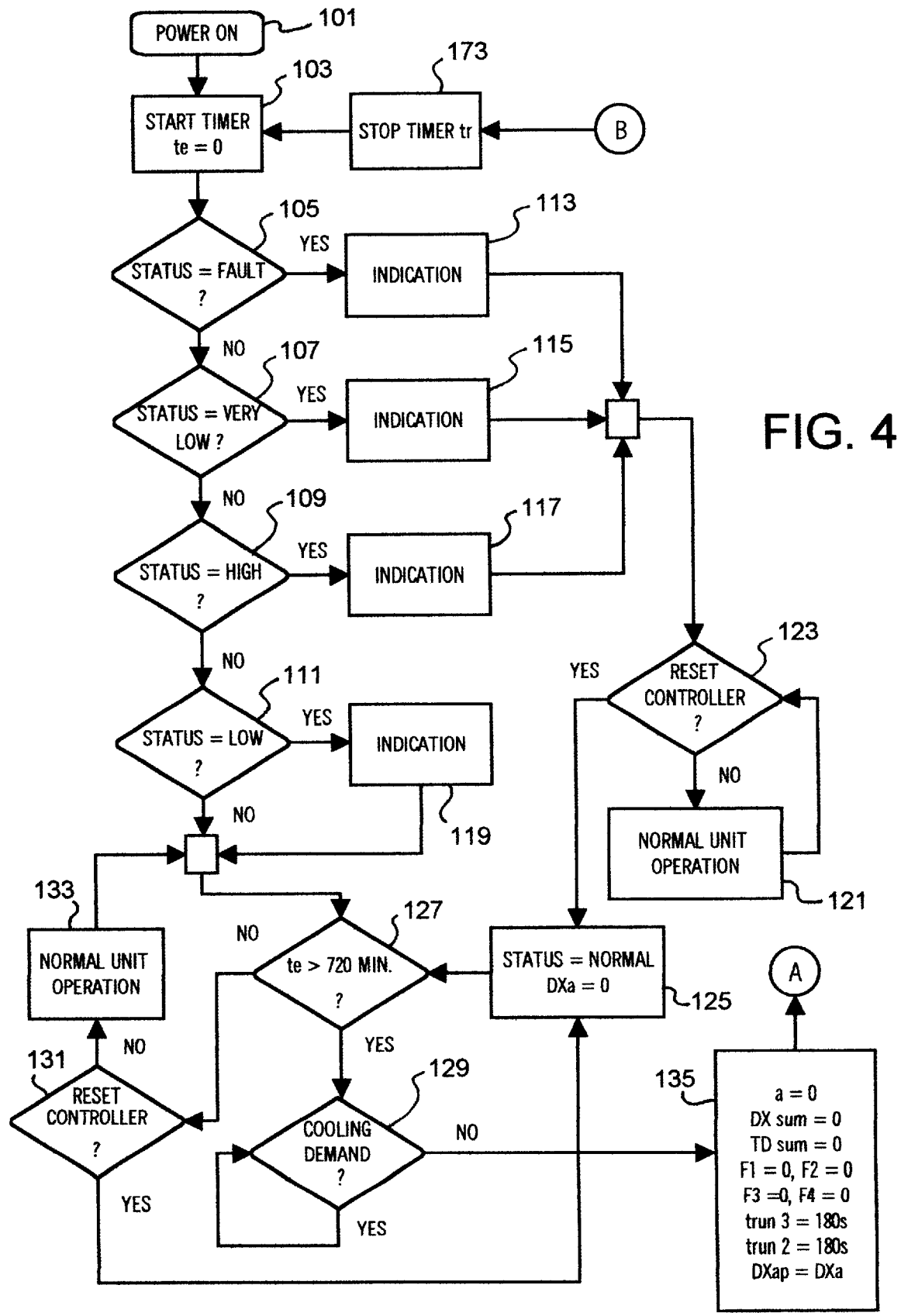
FIGS. 4–7 are detailed flow diagrams of a refrigerant charge level determination algorithm in accordance with the present invention.

If the DXa value exceeds a predetermined maximum value DXmax (step 271), which is determined according to the baseline data, a "High" refrigerant charge level status is indicated, pursuant to step 273, and the algorithm goes to "B" in FIG. 4. For example, in FIG. 2, DXmax is 20.5° F. If the DXa value does not exceed DXmax, a "High" refrigerant charge condition is not indicated. Controller 30 then determines whether DXa is less than a predetermined minimum value DXmin (e.g., 6° F. in FIG. 2), which is also determined according to the baseline data, pursuant to step 275. If not, the algorithm goes to "B" in FIG. 4. If so, a "Low" refrigerant charge status is indicated, pursuant to step 277. If a "Low" charge status is indicated, pursuant to step 277, controller 30 next determines whether a "Very Low" refrigerant charge level is present. A "Very Low" charge status is indicated by any of following three conditions: (a) the average final vapor refrigerant temperature for the test cycle (TDa) exceeds a predetermined temperature (e.g., 260° F.), pursuant to step 279; or (b) the average run time for the previous three cooling cycles (truna) was greater than 20 minutes, the initial liquid refrigerant temperature TLi was less than 95° F. and the off time between cooling cycles toff was less than 10 minutes, pursuant to step 281; or (c) the average value of the DX parameter (DXa) was less than 0.8 multiplied by the previous average value of the DX parameter (DXap), pursuant to step 283. If one of the aforementioned three conditions is satisfied, a "Very Low" refrigerant charge status is indicated, pursuant to step 285 and the algorithm goes to "B" in FIG. 4.

Returning to step 267 in FIG. 5, if the number of events n does not equal 24, the test cycle is not yet complete and normal cooling operation is resumed, pursuant to step 181. Controller 30 will then proceed to step 145 and follow the sequence described hereinabove, beginning with step 145.

In accordance with the present invention, refrigerant charge level detection is accomplished using a method which is relatively independent of outdoor and indoor ambient conditions. Both high and low refrigerant charge level conditions may be determined. Although the preferred embodiment of the present invention, described hereinabove, involves shutting off condenser fan 20 for a period of time determined by a fixed shift in the liquid refrigerant temperature at the outlet of condenser 12 and measuring a change in the vapor refrigerant temperature at the outlet of compressor 18 during the period of time, other embodiments of the present invention may also be used to determine refrigerant charge level. For example, in another embodiment, condenser fan 20 may be shut off for a predetermined fixed period of time. In other embodiments, the perturbation imposed on the system may be shutting off compressor 18 for a fixed period of time or evaporator fan 24 for a fixed period of time and using inputs from temperature sensors 36, 38 and/or 40 to determine refrigerant charge level.

The best mode for carrying out the invention has now been described in detail. Since changes in and additions to the above-described best mode may be made without departing from the nature, spirit and scope of the invention, the invention is not to be limited to the above-described best mode, but only by the appended claims and their proper equivalents.

What is claimed is:

1. A method of determining acceptability of a selected condition in a temperature conditioning system for an indoor space, comprising the steps of:
    perturbing the system while it is in operation by changing operation of at least one component of the system;
    sensing a change in a first operating parameter of the system in response to said perturbing and generating a control signal in response to said change in said first operating parameter being greater than a predetermined limit;
    sensing a change in a second operating parameter of the system during a period of time determined beginning with said perturbing and ending with said control signal;
    comparing said change in said second operating parameter with a reference corresponding to an acceptable selected condition; and
    determining acceptability of said selected condition in response to said comparing.

2. The method of claim 1 wherein the system includes a refrigerant and said selected condition is refrigerant charge level in the system.

3. The method of claim 1 wherein the system includes a refrigerant as a heat transfer medium, an evaporator for evaporating the refrigerant, a condenser for condensing the refrigerant and a compressor for compressing the refrigerant and for circulating the refrigerant between the evaporator and the condenser, the selected condition being refrigerant charge level in the system.

4. The method of claim 3 wherein said first operating parameter is a function of a refrigerant temperature at a selected location between an outlet of the condenser and an inlet of the evaporator.

5. The method of claim 4 wherein said second operating parameter is a function of a refrigerant temperature at a selected location between an outlet of the compressor and an inlet of the condenser.

6. The method of claim 5 wherein the system includes an air mover for moving air through the condenser and said perturbing comprises disabling the air mover for said period of time.

7. The method of claim 5 wherein the system includes an air mover for moving air through the evaporator and said perturbing comprises disabling the air mover for said period of time.

8. The method of claim 5 wherein said perturbing comprises disabling the compressor for said period of time.

9. The method of claim 3 wherein said second operating parameter is a function of refrigerant temperature at a selected location between an outlet of the compressor and an inlet of the condenser.

10. The method of claim 3 wherein the system includes an air mover for moving air through the condenser and said perturbing comprises disabling the air mover for said period of time.

11. The method of claim 3 wherein the system includes an air mover for moving air through the evaporator and said perturbing comprises disabling the air mover for said period of time.

12. The method of claim 3 wherein said perturbing comprises disabling the compressor for said period of time.

13. The method of claim 1 wherein the system includes a refrigerant as a heat transfer medium and said selected condition is refrigerant charge level in the system, said determining acceptability of said selected condition including determining whether the refrigerant charge level is above a predetermined first limit or below a predetermined second limit, said method further including determining whether the refrigerant charge level is below a predetermined third limit which is lower than said second limit in response to the refrigerant charge level being below said second limit.

14. In a space temperature conditioning system having a refrigerant as a heat transfer medium, an evaporator for evaporating the refrigerant, a condenser for condensing the refrigerant and. a compressor for compressing the refrigerant and for circulating the refrigerant between the evaporator and the condenser, a method of determining acceptability of refrigerant charge level in the system, comprising the steps of:
    perturbing the system while it is in operation by changing operation of at least one component of the system for a predetermined period of time;
    sensing a change in refrigerant temperature at at least two selected locations in the system during said period of time in response to said perturbing;
    using said changes in the refrigerant temperature at said at least two selected locations to determine acceptability of the refrigerant charge level.

15. The method of claim 14 wherein one of said selected locations is between an outlet of the condenser and an inlet of the evaporator.

16. The method of claim 15 wherein another one of said selected locations is between an outlet of the compressor and an inlet of the condenser.

17. The method of claim 14 wherein one of said selected locations is between an outlet of the compressor and an inlet of the condenser.

18. The method of claim 14 wherein the system includes an air mover for moving air through the condenser and said perturbing comprises disabling the air mover for said period of time.

19. The method of claim 14 wherein the system includes an air mover for moving air across the evaporator and said perturbing comprises disabling the air mover for said period of time.

20. The method of claim 14 wherein said perturbing comprises disabling the compressor for said period of time.

* * * * *